United States Patent [19]
Johnson

[11] Patent Number: 5,450,585
[45] Date of Patent: Sep. 12, 1995

[54] COMPILER WITH DELAYED CONDITIONAL BRANCHING

[75] Inventor: Mark A. Johnson, New Paltz, N.Y.

[73] Assignee: International Business Machines Corporation, Armonk, N.Y.

[21] Appl. No.: 700,727

[22] Filed: May 15, 1991

[51] Int. Cl.$^6$ .............................................. G06F 9/44
[52] U.S. Cl. ............................ 395/700; 364/280; 364/280.4; 364/280.5; 364/262; 364/261.3
[58] Field of Search ................................ 395/700, 650

[56] References Cited

U.S. PATENT DOCUMENTS

| | | | |
|---|---|---|---|
| 4,566,063 | 1/1986 | Zolnowsky et al. | |
| 4,642,765 | 2/1987 | Cocke et al. | |
| 4,755,966 | 7/1988 | Lee et al. | |
| 4,777,587 | 10/1988 | Case et al. | |
| 4,833,599 | 5/1989 | Colwell et al. | |
| 4,961,141 | 10/1990 | Hopkins et al. | |
| 4,965,724 | 10/1990 | Utsumi et al. | 395/700 |
| 4,967,351 | 10/1990 | Zmyslowski et al. | |
| 4,974,155 | 11/1990 | Dulong et al. | |
| 5,109,331 | 4/1992 | Ishida et al. | 395/375 |
| 5,202,995 | 4/1993 | O'Brien | 395/700 |
| 5,226,128 | 7/1993 | Rau et al. | 395/375 |

FOREIGN PATENT DOCUMENTS

| | | |
|---|---|---|
| 61-082238 | 4/1986 | Japan . |
| 62-003342 | 1/1987 | Japan . |
| 63-205732 | 8/1988 | Japan . |
| 01258033 | 10/1989 | Japan . |

OTHER PUBLICATIONS

*IBM Technical Disclosure Bulletin*, Mar., 1990, p. 99.
*IBM Technical Disclosure Bulletin*, Feb. 1988, pp. 437-439.
*IEEE*—Intellectual Leverage for the Information Society, 28 Feb.–3 Mar. 1983, pp. 278–285.

*Primary Examiner*—Kevin A. Kriess
*Attorney, Agent, or Firm*—Sterne, Kessler, Goldstein & Fox; Mark S. Walker

[57] ABSTRACT

An optimization method or apparatus adapted for use on a compiler for generating machine code optimized for a pipeline processor. A compute-compare-branch sequence in a loop is replaced with a compare-compute-branch sequence. A compute-compare-branch sequence is a sequence of instructions to compute the value of one or more variables, execute a comparison involving the variables, and execute a conditional branch conditioned on the comparison. In the compare-compute-branch sequence, the instructions of the compute-compare-branch sequence are reordered as follows. First, the comparison is executed. In the compare-compute-branch sequence, the comparison involves previously set values of the variables. Second, the computation is executed to compute the current values of the variables. Finally, the conditional branch conditioned on the latter comparison is executed so as to have the effect of executing during the previous execution of the sequence. One or more temporary variables store the previous values of the variables. They are set to the values of the variables at the end of the compare-compute-branch sequence. Before execution of the loop, the temporary variables are set so that the condition will not be met the first time the sequence executes. After execution of the loop, a comparison and a conditional branch are executed. The comparison involves the temporary variables, and the conditional branch is conditioned on the comparison.

30 Claims, 7 Drawing Sheets

COMPILER WITH DELAYED CONDITIONAL BRANCHING

TECHNICAL FIELD

The present invention relates generally to compilers. More particularly, the present invention relates to an optimizer for a compiler.

BACKGROUND ART

Computers known as pipeline processors process instructions in stages. Instruction processing on a pipeline processor is analogous to a pipeline, with each consecutive stage processed in an adjacent stage of the pipeline. Pipeline processors generally send each instruction into the pipeline while instructions preceding it are still in the pipeline.

The capability of a pipeline processor to execute instructions in parallel is exploited fully when all of its stages are kept active. A set of one or more adjacent inactive stages on a pipeline is called a bubble. An operation called a conditional branch can create bubbles. A conditional branch operation comprises a block of instructions which physically follow an instruction to jump to the instruction immediately following the block upon the existence of a specified condition. The block of instructions is called a conditional block. The instruction to jump is called a branch instruction. The condition depends on the results of one or more instructions (called dependent instructions) preceding the conditional branch.

Conditional branches create bubbles as follows. The pipeline processor must finish processing the branch instruction before it can determine the next instruction to enter the pipeline. Therefore, no new instructions enter the pipeline until the branch instruction leaves the pipeline. Accordingly, a bubble the length of the entire pipeline can form following the conditional branch.

Many pipeline processors have bubble-reducing hardware for reducing or eliminating bubbles. Such pipeline processors are capable of overlapping the processing associated with a branch instruction and other instructions independent of the branch (called independent instructions).

FIG. 1 shows block diagram of an example a pipeline processor with bubble reducing hardware. Specifically, the pipeline processor of FIG. 1 reduces bubbles by employing parallel execution units comprising a branch processor 114 and two instruction processors 115.

Referring to FIG. 1, an instruction cache 110 retrieves instructions from a main memory 112 and sends them to a branch processor 114. The branch processor 114 executes branch instructions and dispatches arithmetic instructions to arithmetic processors 115 such as a fixed point processor 116 and a floating point processor 118. The fixed point processor 116 executes arithmetic instructions involving fixed point data. The floating point processor 118 executes arithmetic instructions involving floating point data. The arithmetic instructions could be computation instructions or comparison instructions.

The arithmetic processors 115 store results of computation instructions to a data cache 122, from which the data is stored into the main memory 112. The arithmetic processors 115 set a condition register 120 in the branch processor 114 to indicate the results of comparison instructions.

The separate execution units for processing branch and arithmetic instruction enable the parallel processor of FIG. 1 to overlap the processing associated with a branch instruction and arithmetic instructions as follows. The branch processor 114 dispatches arithmetic instructions and processes some branch instructions without waiting for the arithmetic units to execute instructions which it has previously dispatched to them. Because the branch processor 114 dispatches instructions faster than the arithmetic processors 115 executes them, there are generally several instructions which have been dispatched but have not yet been executed. Accordingly, if the branch processor 114 temporarily stops dispatching instructions, the arithmetic processors 115 execute previously dispatched instructions.

However, the architecture of the pipeline processor of FIG. 1 introduces another possible type of delay when processing conditional branches. Specifically, the branch processor 114 cannot process a branch instruction until the arithmetic processor 115 has set the condition register 120 for the comparison on which the branch depends. Therefore, if a branch instruction closely follows the comparison on which it depends, a bubble can form in front of the conditional branch.

The bubble reducing hardware for reducing or eliminating bubbles following conditional branches is ineffective unless instructions are provided, the processing of which can be overlapped with the processing associated with the conditional branch. Various optimization techniques provide such instructions. A first such optimization technique involves performing a dependency analysis on instructions, and rearranging the order of instructions so that they can be overlapped. On the pipeline processor of FIG. 1, for example, the rearranged instructions could execute while the branch processor 114 is waiting for the condition register 120 to be set. The rearranged instructions could also be executed while the branch processor 114 is processing the branch instruction.

The amount that the first optimization technique reduces bubbles before and following a conditional branch instruction is proportional to the processing time of the independent instructions. Therefore, the first optimization technique will not completely eliminate the bubbles if there are insufficient independent instructions that it can place between the dependent instructions and the conditional branch. The latter is often the case in a compute-compare-branch loop. A compute-compare-branch loop is a loop which contains a compute-compare-branch sequence, that is, a sequence of instructions to execute one or more computations, execute a comparison dependent on the computations, and execute a conditional branch conditioned on the comparison. Many computers spend a significant amount of time processing compute-compare-branch loops.

Execution of the compute-compare-branch loop is as follows:

$$\begin{array}{l} \text{compute}_1 \\ \text{compare}_1 \\ \text{condition}_1 \\ \text{compute}_2 \\ \text{compare}_2 \\ \text{condition}_2 \\ \cdot \\ \cdot \\ \cdot \\ \text{compute}_n \\ \text{compare}_n \end{array}$$

condition$_n$

In the above representation, and in the representations below, only the compute-compare-branch sequences of the compute-compare-branch loop are shown. The loop could contain additional instructions. Also, compute$_i$ represents the computation operation of the $i^{th}$ iteration of the sequence, compare$_i$ represents the comparison operation of the $i^{th}$ iteration, and condition$_i$ represents the conditional branch operation of the $i^{th}$ iteration. As used in this document, operation means a task which is performed by the execution of one or more machine instructions.

An example of a compute-compare-branch loop would be a loop that computed a value of a variable x, compared x to a variable Xmax which represents the greatest value of x computed so far, and assigns Xmax to x if x is greater than Xmax. Pseudocode for the example loop is as follows:

```
begin loop
    compute x
    compare x to Xmax
    if (x > Xmax) then
        Xmax <- x
    end if
end loop
```

FIG. 2A shows two iterations of a compute-compare-branch sequence on the pipeline processor of FIG. 1. In FIG. 2A, as well as in FIG. 2B, blocks in the right-hand column represent the activities of the branch processor 114, and blocks in the left-hand column represent the activities of one of the arithmetic processors 115. Time proceeds from the top of the columns to the bottom. Each arrow indicates a dependency of the operation to which it points on the operation from which it points. Each arrow pointing from right to left represents a delay between the dispatch of an operation from the branch processor 114 and the execution of that operation by the arithmetic processor 115. Each arrow pointing from left to right represents a delay between the execution of a comparison instruction by the arithmetic processor 115 and the setting of the condition register 120 in the branch processor 114. Each bubble indicates a period of inactivity in the arithmetic processor 115.

Looking at FIG. 2A, the branch processor 114 dispatches compute$_1$ in block 202. Immediately thereafter, the branch processor 114 dispatches compare$_1$ in block 204. The branch processor 114 then attempts to execute conditions$_1$. However, it cannot do so until the condition register is set for compare$_1$. The condition code will be set after the delay indicated by arrow 214 from block 212.

Meanwhile, the arithmetic processor 115 processes the first iteration of the sequence as follows. After the delay indicated by arrow 206 from block 202, it receives compute$_1$ from the branch processor 114 and executes it in block 208. After the delay indicated by arrow 210 from block 204, the arithmetic processor 115 receives compare$_1$ from the branch processor 114 and executes it in block 212.

Although the operations of blocks 208 and 212 depend on the operations of blocks 202 and 204, there would be no bubble in the arithmetic processor 115 between block 208 and block 212 for the following reasons. First, the branch processor 114 dispatches compare$_1$ immediately after dispatching compute$_1$. Second, dispatching an operation takes no longer than executing it. Third, the amount of time it takes for a dispatched instruction to reach the arithmetic processor 115 is constant. Therefore, the arithmetic processor 115 will have received compare$_1$ by the time it has finished executing compute$_1$.

After the delay indicated by arrow 214 from block 212, the branch processor 114 executes branch$_1$ in block 216. Branch$_i$ represents the branch instruction of the $i^{th}$ iteration. Assuming the condition of condition$_1$ is not met, the branch processor 114 next dispatches compute$_2$ in block 218. Immediately thereafter, it dispatches compare$_2$ in block 220. The branch processor 114 cannot execute condition$_2$ until the condition register is set for compare$_2$.

After the sum of the amount of the delay indicated by arrow 214 from block 212, the execution time of block 216 and the delay indicated by arrow 222 from block 218, the arithmetic processor 115 receives compute$_2$ from the branch processor and executes it in block 224. This sum is the amount of time between the execution of blocks 212 and 224 and is represented by bubble 225.

After the delay indicated by arrow 226 from block 220, the arithmetic processor 115 receives compare$_2$ from the branch processor 114 and executes it in block 228. Although the operations of blocks 224 and 228 depend on the operations of blocks 218 and 220, there is no bubble between block 224 and block 228 for the same reason there is no bubble between blocks 208 and 212.

After the delay indicated by arrow 230 from block 228, the branch processor 114 executes branch$_2$ in block 232. Assuming the condition of branch$_2$ is met, the branch processor 114 next dispatches conditional_block in block 234. Conditional_block represents the conditional block associated with branch$_2$.

After the sum of the amount of the delay indicated by arrow 230 from block 228, the execution time of block 232 and the delay indicated by arrow 236 from block 234, the arithmetic processor 115 receives conditional_block from the branch processor and executes it in block 238. This sum is the amount of time between the execution of blocks 228 and 238 and is represented by bubble 240.

A second optimization technique, called loop unrolling, can reduce bubbles resulting from a conditional branch in a compute-compare-branch loop. Loop unrolling is performed by combining the instructions that would have been executed in two or more iterations of the original loop into each iteration of an unrolled loop. The number of iterations of the unrolled loop is reduced accordingly. An unrolled loop which contains the instructions of i iterations of the original loop in each iteration is said to be unrolled to a level of i. Unrolling the loop provides additional independent instructions. The method of the first optimization technique can then be performed to rearrange the unrolled loop so that execution of the independent instructions overlaps the processing of the instructions associated with the conditional branch.

A compute-compare-branch loop unrolled to a level of two executes essentially as follows:

```
compute₁
compare₁
```

```
compute₂
compare₂
condition₁
condition₂
compute₃
compare₃
compute₄
compare₄
condition₃
condition₄
    .
    .
    .
compute₍ₙ₋₁₎
compare₍ₙ₋₁₎
computeₙ
compareₙ
condition₍ₙ₋₁₎
conditionₙ
```

The above representation shows only the compute-compare-branch sequences of a loop which could contain additional instructions. The subscripts in the above representation indicate the iteration of the original loop with which the computations, comparisons and conditional blocks are associated.

Note that if the original number of iterations is odd, execution is slightly different. For example, the first iteration of the original loop could be executed explicitly before the loop. The loop would then execute essentially as follows:

```
compute₁
compare₁
condition₁
compute₂
compare₂
compute₃
compare₃
condition₂
condition₃
compute₄
compare₄
compute₅
compare₅
condition₄
condition₅
    .
    .
    .
compute₍ₙ₋₁₎
compare₍ₙ₋₁₎
computeₙ
compareₙ
condition₍ₙ₋₁₎
conditionₙ
```

Whether loop unrolling optimization provides enough independent instructions to eliminate bubbles depends on the nature of the specific loop unrolled. For example, in processing an iteration of an unrolled loop having the operations of original loop iterations i and i−1 on the pipeline processor of FIG. 1, loop unrolling would reduce the bubble preceding condition$_{(i-1)}$ by the amount of time it would take the arithmetic processor 115 to process compute$_i$ and compare$_i$. It would reduce the bubble preceding condition$_i$ by the amount of time it would take the arithmetic branch processor 115 to process condition$_{(i-1)}$.

Loop unrolling optimization has several potential weaknesses. First, if the conditional block associated with condition$_{(i-1)}$ of the compute-compare-branch sequence is either rarely executed or requires little time to execute, loop unrolling would not substantially reduce the bubble associated with condition$_i$. Because condition$_i$ represents half of the conditional branches in the loop, the performance benefits of unrolling such a loop would be limited.

Furthermore, loop unrolling optimization can be performed only on a compute-compare-branch sequence which executes on every iteration of the compute-compare-branch loop. Such a sequence is called an unconditional compute-compare-branch sequence. Loop unrolling therefore does not reduce bubbles associated with a compute-compare-branch sequence within a conditional block in a compute-compare-branch loop. Such a sequence is called a conditional compute-compare-branch sequence.

Although the problem of delays associated with conditional branches has been explained in the context the parallel processor of FIG. 1, the problem extends to all pipeline processors.

What is needed, therefore, is an optimization technique which improves pipeline processor efficiency in processing a compute-compare-branch loop in which the average computation time of the conditional block associated with the compute-compare-branch sequence is small or in which the compute-compare-branch sequence is conditional.

DISCLOSURE OF INVENTION

The present invention is directed towards a technique called delayed conditional branching optimization for generating machine code optimized for a pipeline processor. Delayed conditional branching optimization replaces a compute-compare-branch sequence in a compute-compare-branch loop with a compare-compute-branch sequence. A compute-compare-branch loop is a loop having a compute-compare-branch sequence, that is a sequence of instructions to compute the value of one or more variables, execute a comparison involving the one or more variables, and execute a conditional branch conditioned on the comparison.

In the compare-compute-branch sequence, the instructions of the compute-compare-branch sequence are reordered as follows. First, the comparison is executed. The comparison involves previously set value or values of the one or more variables. Second, the computation is executed to compute the current value or values of the one or more variables. Finally, the conditional branch conditioned on the comparison is executed.

Appropriate measures are taken so that the conditional branch executes as it would have during the previous iteration of the original loop. Note, however, that if the compute-compare-branch sequence is conditional, the conditional branch actually executes as it would have during the last iteration in which the sequence executed.

One or more temporary variables could store the previous values of the variables. At the end of the sequence, the temporary variables could be set to the values of the variables.

Initializing and terminating operations are performed to assure that the effect of the compare-compute-branch sequence is identical to the effect of the compute-compare-branch sequence. The initializing operation comprises initializing the temporary variables before execution of the compare-compute-branch sequence. Specifically, the temporary variables are set so that the condition will not be met the first time the sequence executes.

The terminating operations comprise executing a comparison and a conditional branch after execution of the loop. The comparison involves the temporary variables, and the conditional branch is conditioned on the comparison. If the sequence did not execute, the conditional block will not be executed. Otherwise, appropriate measures are taken so that the conditional branch executes as it would have during the last iteration of the original loop in which the sequence executed.

The computation instructions often require substantial processing time. Therefore, placing these instructions between the each comparison and conditional branch often minimizes bubbles.

Delayed conditional branching optimization is not limited to a compute-compare-branch sequence which is executed during each iteration of a loop. After the first execution of the sequence, the temporary variables represent the values of the variables computed the previous time the sequence executed, whether or not it executed during the previous iteration of the loop. Delayed conditional branching optimization can therefore be performed on a compute-compare-branch sequences which is part of a conditional block within the loop.

The foregoing and other objects, features and advantages of the invention will be apparent from the following more particular description of preferred embodiments of the invention, as illustrated in the accompanying drawings.

BRIEF DESCRIPTION OF DRAWINGS

The present invention will be more fully understood with reference to the accompanying drawings in which.

BEST MODES FOR CARRYING OUT THE INVENTION

Figure 1:
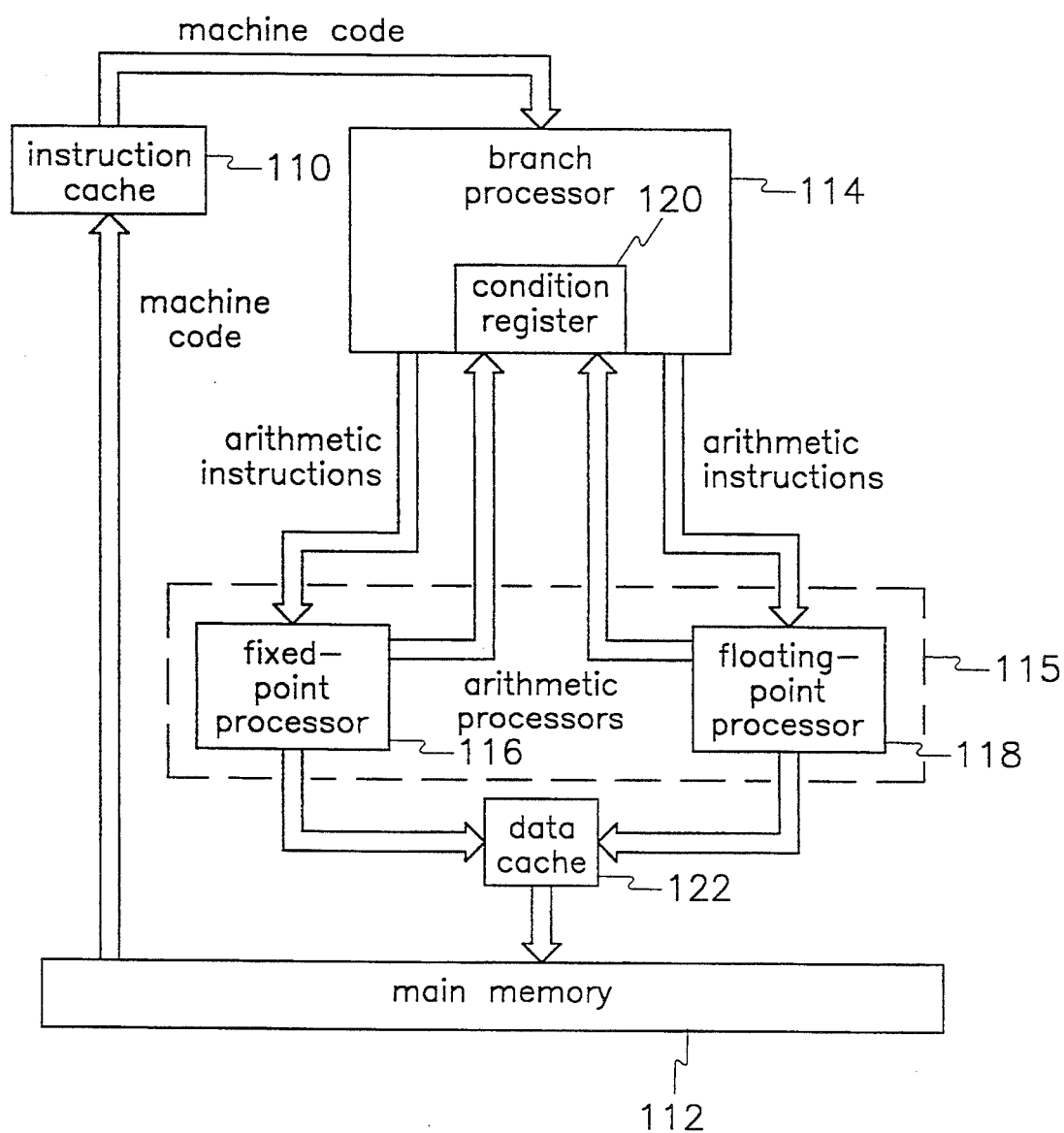
FIG. 1 shows a block diagram of an example of a computer with pipeline architecture.

The present invention is directed to an optimization technique called delayed conditional branching optimization. Delayed conditional branching optimization restructures a compute-compare-branch loop so as to improve performance by reducing or eliminating the bubbles associated with conditional branches. On pipeline processors with bubble reducing hardware, delayed conditional branching optimization reduces or eliminates bubbles following conditional branches, as well as bubbles in front of conditional branches.

When compiled with the compiler having delayed conditional branching optimization, execution of a compute-compare-branch loop which iterates n times is represented as follows:

```
compute_initial
execution_1
    compare_previous
    compute_current
    condition_previous
        assign_current_to_previous
execution_2
    compare_previous
    compute_current
    condition_previous
        assign_current_to_previous
    .
    .
    .
execution_n
    compare_previous
    compute_current
    condition_previous
        assign_current_to_previous
compare_previous
condition_previous
```

In the above representation, the $i^{th}$ execution of the sequence is represented by the four operations under execution$_i$. If the compute-compare-branch sequence was conditional, execution$_i$ would not necessarily be in the $i^{th}$ execution of the sequence. An initialization consisting of operation compute$_{initial}$ is executed before execution of the loop. Compute$_{initial}$ represents instructions to set a temporary variable, array or other data structure called previous_value so that the condition on which the conditional branch depends will not exist the first time compare$_{previous}$ is executed.

Execution of the loop involves executing the four operations associated with execution$_i$ each time the compare-compute-branch sequence is executed. First, compare$_{previous}$ represents instructions to execute a comparison involving the value or values of previous_value. Second, compute$_{current}$ represents instructions to compute the value of the variable or variables on which the next comparison will depend. Third, condition$_{previous}$ represents a conditional block dependent on the results of compare$_{previous}$.

If the results of condition$_{previous}$ indicate that the conditional block is executed, it executes as it would have during the previous iteration of the original loop. Note, however, that if the compute-compare-branch sequence is conditional, the conditional branch actually executes as it would have during the last iteration in which the sequence executed.

Finally, assign_current_to_previous represents instructions to assign the value or values of the variable or variables computed in compute$_{current}$ to previous_value.

After execution of the loop, two terminating operations are performed. First, compare$_{previous}$ represents instructions to execute a comparison involving the value or values of previous_value. If the compute-compare-branch sequence executed at least once, this comparison involves the value or values calculated by the compute$_{current}$ of the last execution. Otherwise, it involves the value or values set by compute$_{initial}$. Second, condition$_{previous}$ represents a conditional block dependent on compare$_{previous}$. If the sequence did not execute, condition$_{previous}$ will not be executed. Otherwise, appropriate measures are taken so that condition$_{previous}$ executes as it would have during the last iteration of the original loop in which the sequence executed.

A compute-compare-branch loop could contain multiple compute-compare-branch sequences independent of each other. If compiled with a compiler having delayed conditional branching optimization, execution of such a loop is similar to the execution of a loop with one compute-compare-branch sequence, except that associated with each sequence would be a previous_value and initialization, execution and termination operations.

A compute-compare-branch loop could also contain multiple compute-compare-branch sequences which depend on each other. For example, the conditional branch of an outer compute-compare-branch sequence could contain an inner compute-compare-branch sequence. If compiled on a compiler having delayed conditional branching optimization, execution of such a loop would be as follows:

```
compute_initial
COMPUTE_initial
execution_1
    compare_previous
    compute_current
    condition_previous
        COMPARE_previous
        COMPUTE_current
        CONDITION_previous
        ASSIGN_CURRENT_TO_PREVIOUS
    assign_current_to_previous
execution_2
    compare_previous
    compute_current
    condition_previous
        COMPARE_previous
        COMPUTE_current
        CONDITION_previous
        ASSIGN_CURRENT_TO_PREVIOUS
    assign_current_to_previous
    .
    .
    .
execution_n
    compare_previous
    compute_current
    condition_previous
        COMPARE_previous
        COMPUTE_current
        CONDITION_previous
        ASSIGN_CURRENT_TO_PREVIOUS
    assign_current_to _previous
compare_previous
condition_previous
    COMPARE_previous
    COMPUTE_current
    CONDITION_previous
    ASSIGN_CURRENT_TO_PREVIOUS
COMPARE_previous
CONDITION_previous
```

In the above representation, the $i^{th}$ execution of the outer sequence is represented by the four operations under execution$_i$. Operations associated with the outer compute-compare-branch sequence are written in lower case letters, and operations associated with the inner compute-compare-branch sequence are written in capital letters.

Execution of the loop is similar to the execution of the loop with a single compute-compare-branch sequences, except that associated with each sequence would be a previous_value and initialization, execution and termination operations.

Note that the last execution of the inner compute-compare-branch sequence might be executed during the termination operations of the first sequence. Therefore, the termination operations of the outer sequence must be executed before the termination operations of the inner sequence.

Figure 2A:
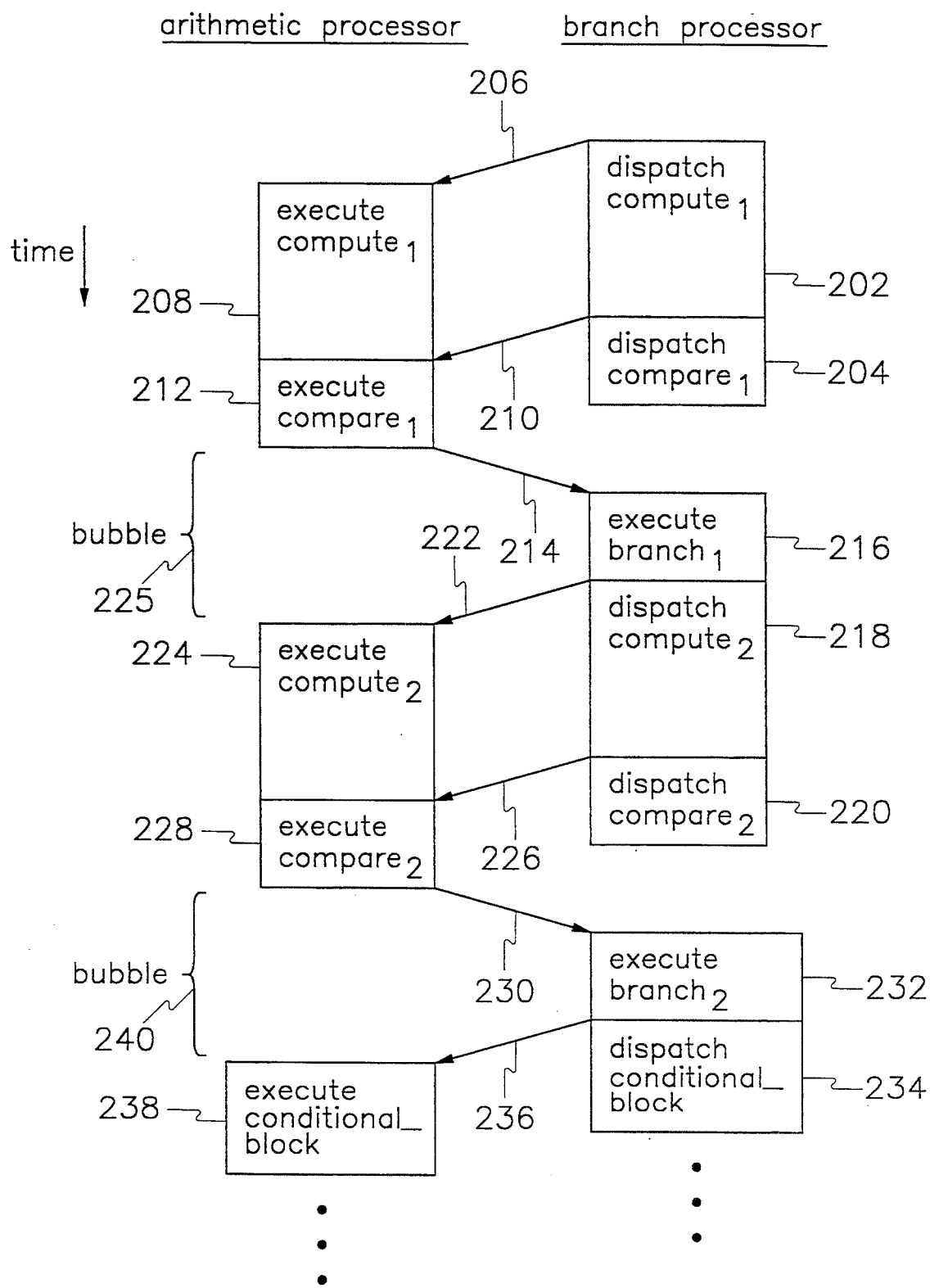
FIG. 2A shows the execution of a compute-compare-branch sequence on the pipeline processor of FIG. 1.
Figure 2B:
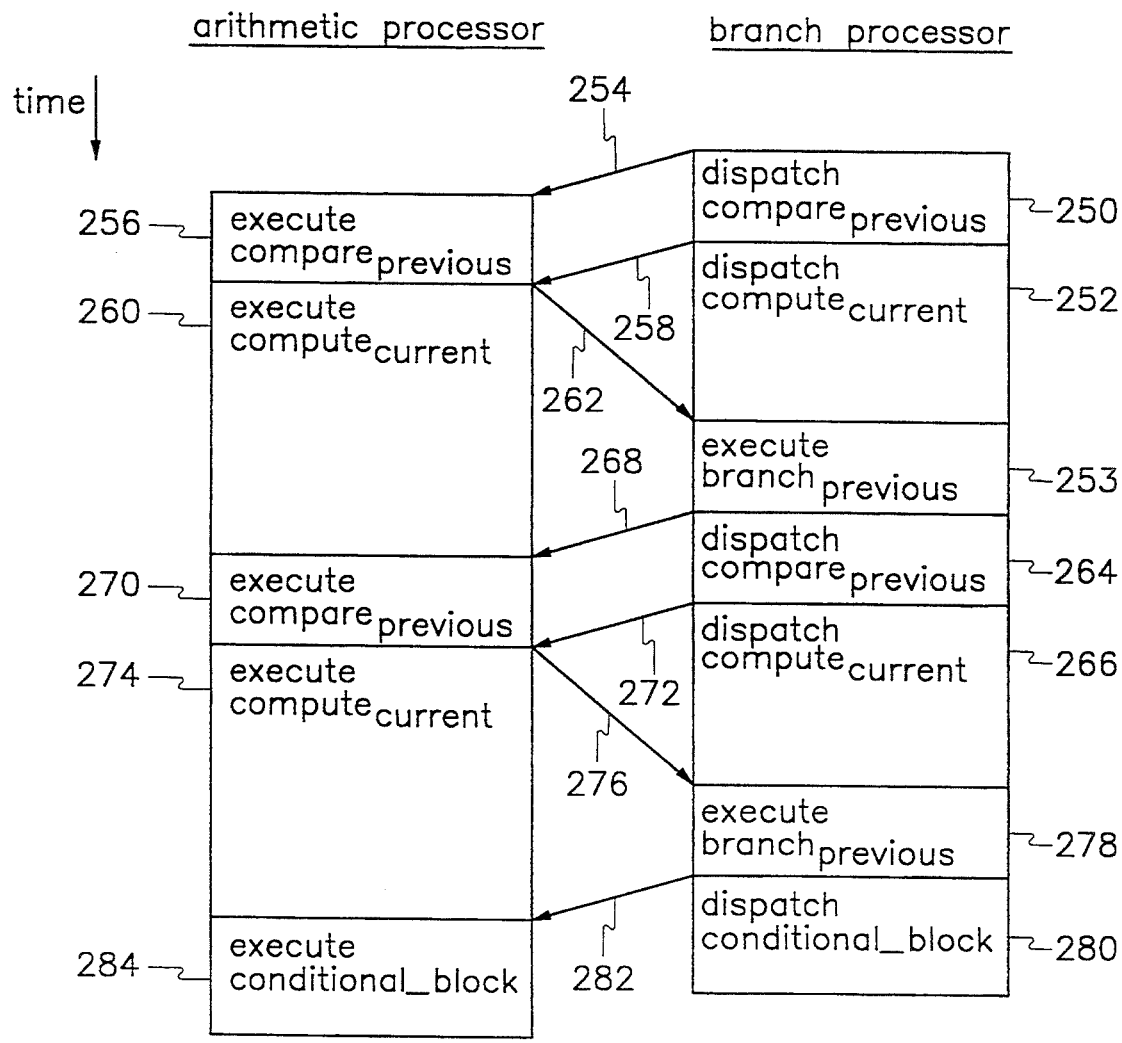
FIG. 2B shows the execution of a compare-compute-branch sequence on the pipeline processor of FIG. 1.

FIG. 2B illustrates how delayed conditional branching optimization reduces or eliminates bubbles. FIG. 2B shows two executions of the compare-compute-branch sequence on the pipeline processor of FIG. 1.

Looking at FIG. 2B, the branch processor 114 dispatches compare$_{previous}$ in block 250. Immediately thereafter, the branch processor 114 dispatches compute$_{current}$.

Meanwhile, after the delay indicated by arrow 254 from block 250, the arithmetic processor 115 receives compare$_{previous}$ from the branch processor 114 and executes the operation in block 256. After the delay indicated by arrow 258 from block 252, the arithmetic processor 115 receives compute$_{current}$ and executes the operation in block 260.

Although the operations of blocks 256 and 260 depend on the operations of blocks 250 and 252, there is no bubble between block 256 and block 260 for the following reasons. First, the branch processor dispatches compute$_{current}$ immediately after dispatching compare$_{previous}$. Second, dispatching an operation takes no longer than executing it. Third, the amount of time it takes for a dispatched instruction to reach the arithmetic processor 115 is constant. Therefore, the arithmetic processor 115 will have received compute$_{current}$ by the time it has finished executing compare$_{previous}$.

After the delay indicated by arrow 262 from block 256, the condition register 120 is set for compare$_{previous}$. The branch processor 114 then executes branch$_{previous}$ in block 253.

Assuming the condition of branch$_{previous}$ is not met in the first execution of the compare-compute-branch sequence, the branch processor next dispatches compare$_{previous}$, the first operation of the second execution of the compare-compute-branch sequence, in block 264.

After the sum of the amount of the delay indicated by arrow 262 from block 256, the execution time of block 253 and the delay indicated by arrow 268 from block 264, the arithmetic processor 115 receives compare$_{previous}$ from the branch processor and executes it in block 270. This sum would often be no greater than the execution time of block 260. Therefore, there would often be no bubble between block 260 and block 270.

In block 266, the branch processor 114 dispatches compute$_{current}$. After the delay indicated by arrow 272 from block 266, the arithmetic processor 115 receives compute$_{current}$, and it processes the operation in block 274.

After the delay indicated by arrow 276 from block 270, the condition register for compare$_{previous}$ is set for branch$_{previous}$. The branch processor 114 then executes branch$_{previous}$ in block 278. Assuming the condition of branch$_{previous}$ is met in the second execution of the compare-compute-branch sequence, the branch processor next dispatches conditional_block, the conditional block associated with branch$_{previous}$, in block 280.

After the sum of the amount of the delay indicated by arrow 276 from block 270, the execution time of block 278 and the delay indicated by arrow 282 from block 280, the arithmetic processor 115 receives conditional_block from the branch processor and executes it in block 284. This sum would often be no greater than the execution time of block 274. Therefore, there would often be no bubble between block 274 and block 284.

Figure 3:
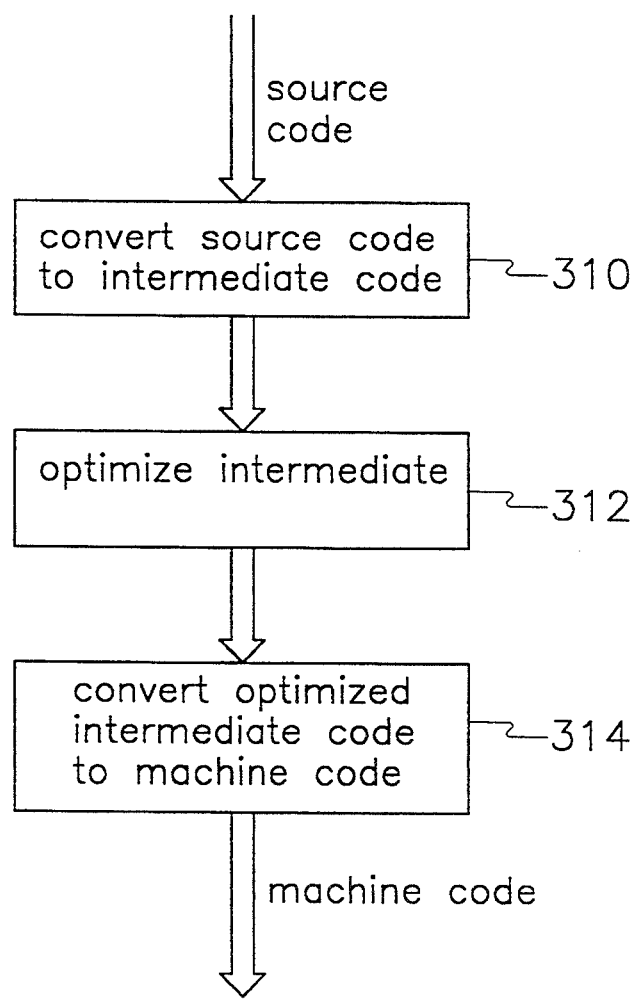
FIG. 3 shows a flowchart of the operation of a compiler having delayed conditional branching optimization.

FIG. 3 shows a flowchart of the operation of the compiler having delayed conditional branching optimization. First, block 310 is executed to convert source code to intermediate code. Second, block 312 is executed to convert the intermediate code into optimized intermediate code. Finally, block 314 is executed to convert the optimized intermediate code to optimized machine code.

Note that the block 314 could instead operate before block 312. In such a configuration, block 314 would convert intermediate code to machine code and block 312 would convert the machine code to optimized machine code.

Figure 4:
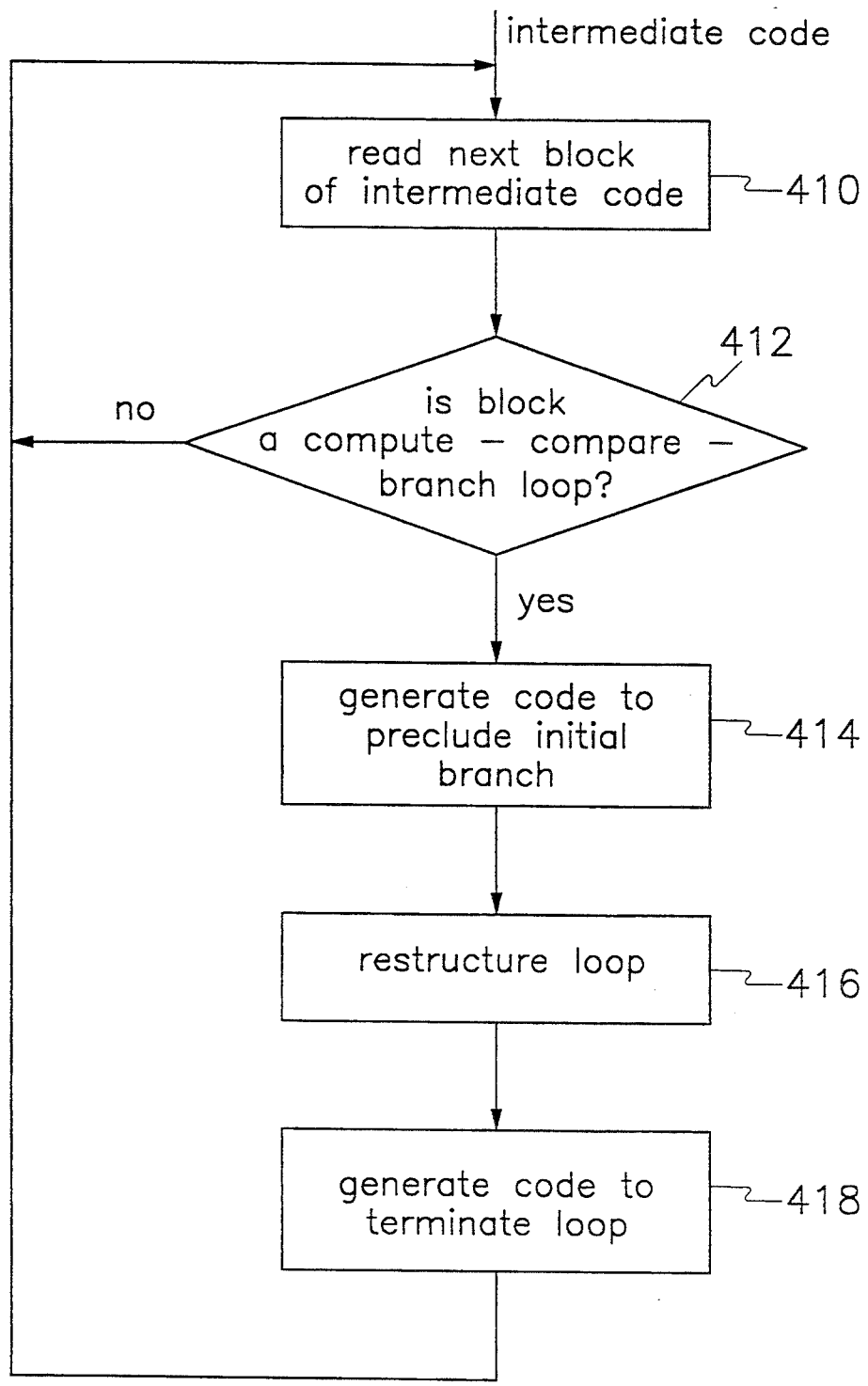
FIG. 4 shows a flowchart of the operation of the delayed conditional branch optimization technique of FIG. 3.

FIG. 4 shows a flowchart of the operation of the delayed conditional branching optimization technique. This technique is part of the optimization performed in block 312 of FIG. 3. First, block 410 is executed to read the next block of intermediate code. Second, diamond 412 is executed to determine whether the block is a compute-compare-branch loop. If not, flow of control returns to block 410. Otherwise, flow of control goes to block 414.

Note that block 410 and diamond 412 operate to detect a compute-compare-branch loop. Various other ways to detect such a loop would be obvious to one of ordinary skill in the art. Also, the loop detection method could be incorporated into the optimizer, and not separate for the delayed conditional branching optimization technique.

Block 414 performs the initialization for each compute-compare-branch sequence in the loop by generating the instructions represented by compute$_{initial}$. The compute$_{initial}$ operations set the previous_value associated with each sequence so that the condition on which the conditional branch of that sequence depends will not exist the first time compare$_{previous}$ is executed.

After execution of block 414, block 416 executes to restructure the loop. Block 416 replaces each compute-compare-branch sequence with the instructions represented by compare$_{previous}$, compute$_{current}$, condition$_{previous}$ and assign_current_to_previous.

After execution of block 416, block 418 executes to generate the loop termination instructions associated with each compute-compare-branch sequence in the loop. The loop termination instructions are the instructions represented by compare$_{previous}$ and condition$_{previous}$. Block 418 places the termination instructions associated with each compute-compare-branch sequence after the termination instructions of any compute-compare-branch sequence on which it depends.

Note that once diamond 412 detects a compute-compare-branch loop, blocks 414, 416 and 418 could execute in any order. After these three blocks are executed, flow of control returns to block 410 to search for the next compute-compare-branch loop. Thus, flow of control returns to block 410 after execution of block 418.

Figure 5:
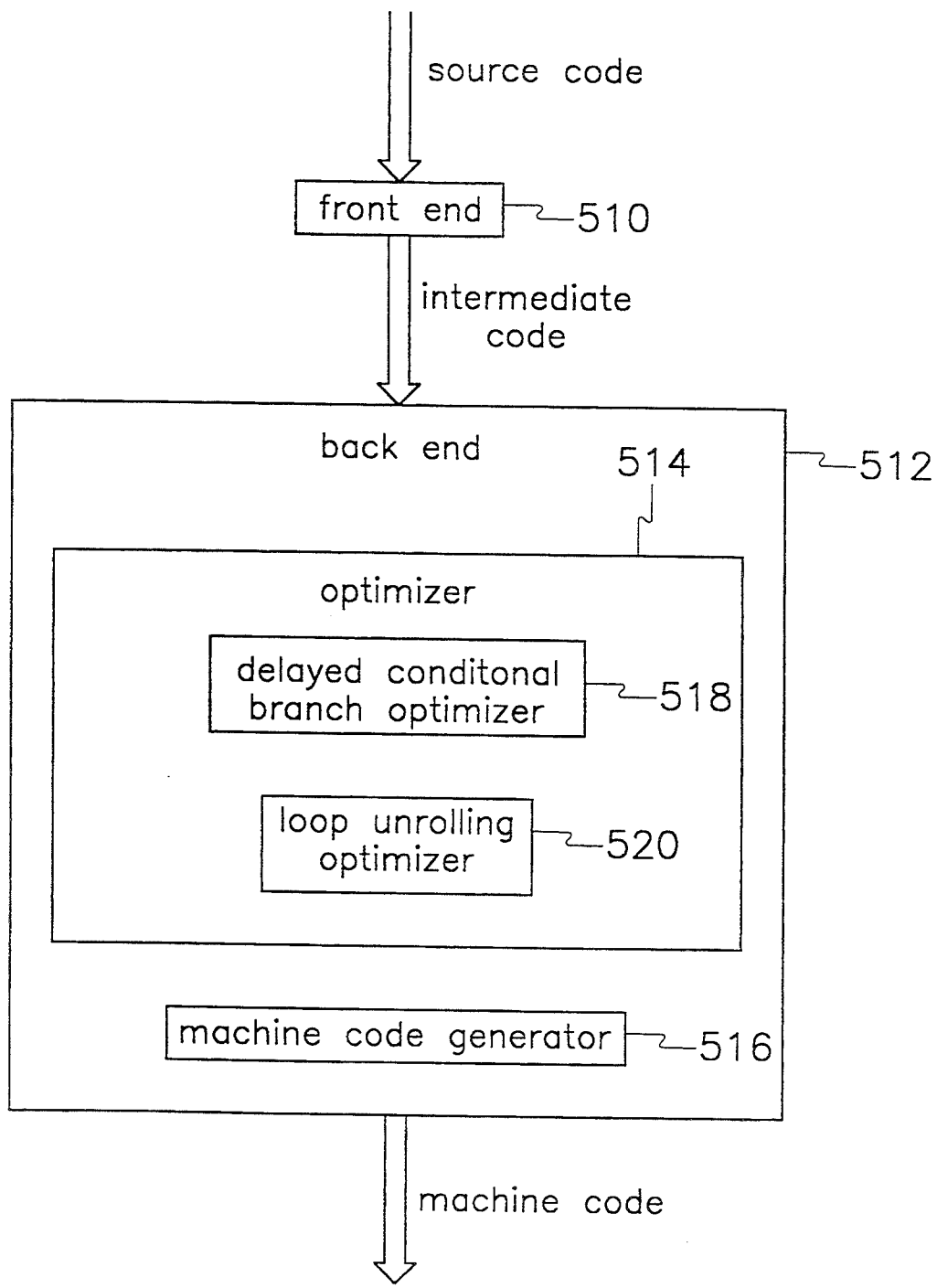
FIG. 5 shows a block diagram of the compiler having delayed conditional branching optimization of FIG. 3.

FIG. 5 shows a block diagram of a compiler having delayed conditional branching optimization. A front end 510 converts source code into intermediate code. The front end 510 corresponds to block 310 of FIG. 3. A back end 512 converts the intermediate code into optimized machine code. The back end includes an optimizer 514 and a machine code generator 516. The optimizer 514 converts the intermediate code into optimized intermediate code and corresponds to block 312 of FIG. 3. The optimizer includes a delayed conditional branch optimizer 518. The delayed conditional branch optimizer 518 corresponds to the delayed conditional branch optimization technique of FIG. 4. The machine code generator 516 converts the optimized intermediate code into optimized machine code. It corresponds to block 314 of FIG. 3.

Note that the positions of the machine code generator 516 and the optimizer 514 could be reversed. In such a configuration, the machine code generator 516 would convert intermediate code into machine code, and the optimizer 514 would convert machine code into optimized machine code.

Figure 6:
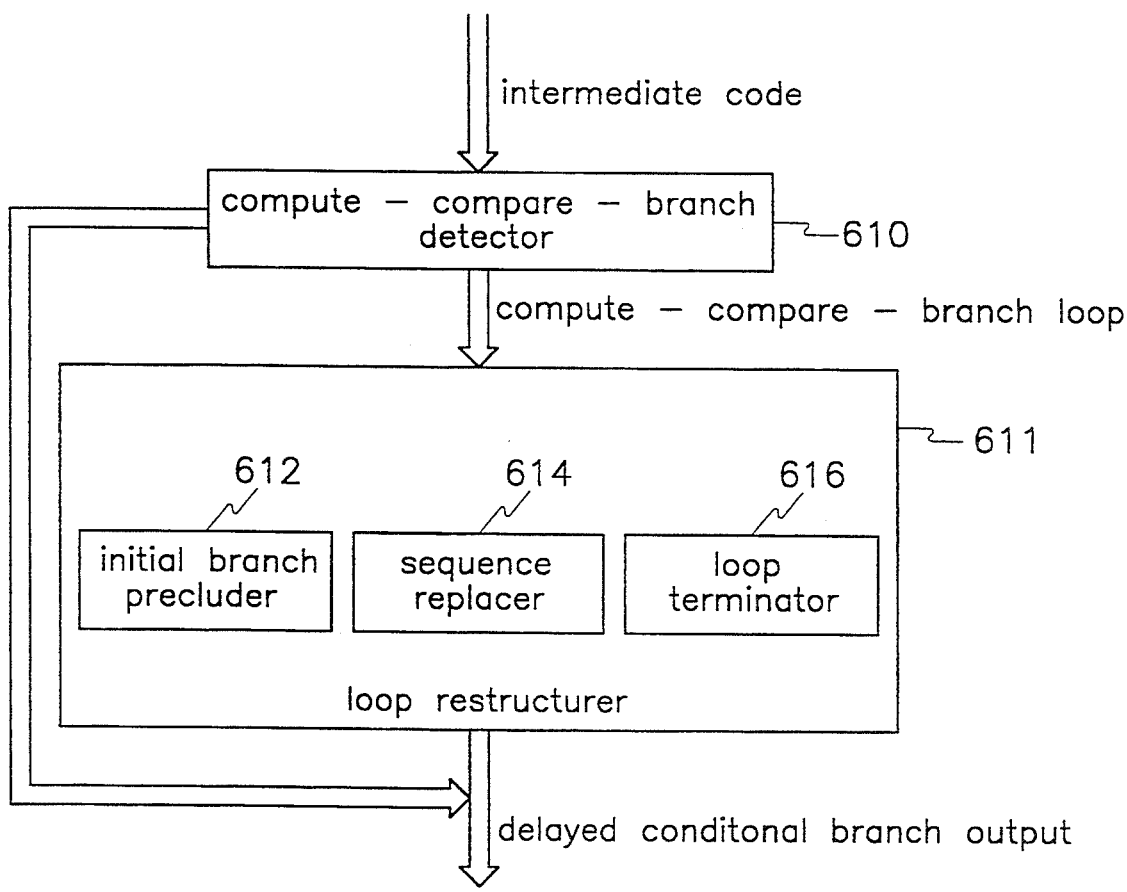
FIG. 6 shows a block diagram of the delayed conditional branch optimizer of FIG. 5.

FIG. 6 is a functional block diagram of the delayed conditional branch optimizer 518. The delayed conditional branch optimizer 518 consists of a compute-compare-branch detector 610 and a loop restructurer 611. The loop restructurer 611 contains an initial branch precluder 612, a sequence replacer 614 and a loop terminator 616.

The compute-compare-branch detector 610 continually scans the intermediate code for compute-compare-branch loops. It detects such loops in the manner explained in the text accompanying block 410 and diamond 412 of FIG. 4. As with block 410 and diamond 412, the compute-compare-branch detector 610 could be an element of the optimizer 514 which is not separate for the delayed conditional branch optimizer 518. As discussed with respect to FIGS. 3 and 4, the input to the compute-compare-branch detector 610 may be intermediate code or machine code. This input to the computer-compare-branch detector 610 is referred to as the delayed conditional branch input code.

Until detecting such a loop, the compute-compare-branch detector 610 outputs the intermediate code unmodified as delayed conditional branch output. Each time it detects such a loop, it sends compute-compare-branch code which includes the loop to the loop restructurer 611. The components of the loop restructurer 611 (that is, the initial branch precluder 612, the sequence replacer 614 and the loop terminator 616) then operate in any order to generate the delayed conditional branch output.

The initial branch precluder 612 generates the instructions represented by compute$_{initial}$ to perform the initialization for each compute-compare-branch sequence in the loop. It operates in the manner explained in the text accompanying block 414 of FIG. 4.

The sequence replacer 614 generates the instructions represented by compare$_{previous}$, compute$_{current}$, condition$_{previous}$ and assign_current_to_previous to replace the compute-compare-branch sequence with a compare-compute-branch sequence. It operates in the manner explained in the text accompanying block 416 of FIG. 4.

The loop terminator 616 generates the instructions represented by compare$_{previous}$ and condition$_{previous}$ to terminate each compute-compare-branch sequence in the loop. It operates in the manner explained in the text accompanying block 418 of FIG. 4.

Once the initial branch precluder 612, the sequence replacer 614 and the loop terminator 616 have executed, the compute-compare-branch detector 610 scans the intermediate code searching for the next compute-compare-branch loop.

Several variations of the compiler having delayed conditional branching optimization are possible. For example, one variation performs delayed conditional branching optimization only on unconditional compute-compare-branch sequences of compute-compare-branch loops. This variation could be implemented by having diamond 412 of FIG. 4 detect only unconditional compute-compare-branch sequences.

A second variation performs delayed conditional branching optimization only on conditional computecompare-branch sequences of compute-compare-branch loops. This variation could be implemented by having diamond 412 of FIG. 4 detect only conditional compute-compare-branch sequences.

A third variation performs delayed conditional branching optimization on conditional compute-compare-branch sequences and loop unrolling optimization on unconditional compute-compare-branch sequences of compute-compare-branch loops. It could, for example, unroll unconditional loops to a level of two. When compiled on the third variation of the compiler, a compute-compare-branch loop with a compute-compare-branch sequence conditioned on the conditional branch of an unconditional compute-compare-branch sequence executes essentially as follows:

```
compute_initial
COMPUTE_1
COMPARE_1
COMPUTE_2
COMPARE_2
CONDITION_1
    compare_previous
    compute_current
    condition_previous
    assign_current_to_previous
CONDITION_2
    compare_previous
    compute_current
    condition_previous
    assign_current_to_previous
COMPUTE_3
COMPARE_3
COMPUTE_4
COMPARE_4
CONDITION_3
    compare_previous
    compute_current
    condition_previous
    assign_current_to_previous
CONDITION_4
    compare_previous
    compute_current
    condition_previous
    assign_current_to_previous
.
.
.
COMPUTE_(n-1)
COMPARE_(n-1)
COMPUTE_n
COMPARE_n
CONDITION_(n-1)
    compare_previous
    compute_current
    condition_previous
    assign_current_to_previous
CONDITION_n
    compare_previous
    compute_current
    condition_previous
    assign_current_to_previous
compare_current
condition_current
```

In the above representation, the numeric subscripts to the operations indicate the iteration of the original loop with which the operation is associated. The operations generated by loop unrolling optimization are written in capital letters. The operations generated by delayed conditional branching optimization are written in lower case letters.

Note that if the original number of iterations is odd, execution is slightly different. For example, the first iteration of the original loop could be executed explicitly before the loop. The loop would then execute essentially as follows:

```
compute_initial
COMPUTE_1
COMPARE_1
CONDITION_1
    compare_previous
    compute_current
    condition_previous
    assign_current_to_previous
COMPUTE_2
COMPARE_2
COMPUTE_3
COMPARE_3
CONDITION_2
    compare_previous
    compute_current
    condition_previous
    assign_current_to_previous
CONDITION_3
    compare_previous
    compute_current
    condition_previous
    assign_current_to_previous
COMPUTE_4
COMPARE_4
COMPUTE_5
COMPARE_5
CONDITION_4
    compare_previous
    compute_current
    condition_previous
    assign_current_to_previous
CONDITION_5
    compare_previous
    compute_current
    condition_previous
    assign_current_to_previous
.
.
.
COMPUTE_(n-1)
COMPARE_(n-1)
COMPUTE_n
COMPARE_n
CONDITION_(n-1)
    compare_previous
    compute_current
    condition_previous
    assign_current_to_previous
CONDITION_n
    compare_previous
    compute_current
    condition_previous
    assign_current_to_previous
compare_current
condition_current
```

The third variation of the compiler having delayed conditional branching optimization would be implemented by having diamond 412 of FIG. 4 detect only conditional compute-compare-branch loops, and by including a loop unrolling optimizer 520, as well as the delayed conditional branching optimizer 518, in the optimizer 514 of FIG. 5. The loop unrolling optimizer 520 would perform loop unrolling in the manner described in the Background section of this document.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A computer-implemented compiler optimization method of converting source code into optimized machine code in a compiler comprising an optimizer including a delayed conditional branch optimizer having a compute-compare-branch detector and a loop restructurer, the method comprising the steps of:

(a) detecting, by the compute-compare-branch detector, in delayed conditional branch input code, a loop having a compute-compare-branch sequence comprising instructions to:
  (1) execute a computation to compute the value of a variable,
  (2) execute a comparison involving said variable, and
  (3) execute conditional instructions if a condition is indicated by said comparison;

(b) generating a first delayed conditional branch output by the compute-compare-branch detector when said loop is not detected in said step (a);

(c) generating a compute-compare-branch code comprising said loop with a compute-compare-branch sequence by the compute-compare-branch detector when said compute-compare-branch detector detects said loop in said step (a);

(d) replacing said compute-compare-branch sequence with a compare-compute-branch sequence by the loop restructurer, said compare-compute-branch sequence comprising instructions to:
  (1) execute said comparison involving a previous value of said variable,
  (2) execute said computation to compute a current value of said variable, and
  (3) execute said conditional instructions if said condition is indicated by said comparison involving said previous value of said variable;

(e) generating a second delayed conditional branch output by said loop restructurer, said second delayed conditional branch output comprising said compare-compute-branch sequence.

2. The method of claim 1, wherein the loop restructurer comprises an initial branch precluder, sequence replacer, and loop terminator, said step (d) comprises the steps of:

(i) generating an operation by said initial branch precluder, said operation configured to be executed before said loop to set a temporary variable such that said condition will not be indicated when said comparison involving said temporary variable is executed, (ii) replacing, by said sequence replacer, said compute-compare-branch sequence contained in said loop of said compute-compare-branch code received from the compute-compare-branch detector with instructions to:
  a) execute said comparison involving said temporary variable,
  b) execute said computation to compute said current value of said variable,
  c) execute said conditional instructions if said condition is indicated by said comparison involving said previous value of said variable, and
  d) assign the value of said variable to said temporary variable; and (iii) generating operations by said loop terminator, said operations configured to be executed after said loop to:
  e) execute said comparison involving said temporary variable; and
  f) execute said conditional instructions if said condition is indicated by said comparison involving said previous value of said variable.

3. The method of claim 1, wherein said delayed conditional branch input code is intermediate code and said first and second delayed conditional branch output code are optimized intermediate code.

4. The method of claim 3, wherein said compiler further comprises a front end and a back end coupled to said front end, the back end comprising said optimizer and a machine code generator coupled to said optimizer, further comprising the steps of:
  (c) converting the source code into said intermediate code by said front end; and
  (d) converting said optimized intermediate code received from said optimizer into said optimized machine code by said machine code generator.

5. The method of claim 1, wherein said delayed conditional branch input code is machine code and said first and second delayed conditional branch output code are said optimized machine code.

6. The method of claim 5, wherein said compiler further comprises a front end and a back end coupled to said front end, the back end comprising said optimizer and a machine code generator coupled to said optimizer, further comprising the steps of:
  (c) converting the source code into said intermediate code by the front end; and
  (d) converting said intermediate code into said machine code by the machine code generator.

7. The method of claim 1, further comprising a step of repeating steps (a) through (e) such that in said second delayed conditional branch output code, each said compute-compare-branch sequence occurring in a loop is replaced with a compare-compute-branch sequence.

8. The method of claim 1, wherein said compute-compare-branch sequence is replaced by said compare-compute-branch sequence only when said compute-compare-branch sequence would have executed during each iteration of said loop.

9. The method of claim 1, wherein said compute-compare-branch sequence is replaced by said compare-compute-branch sequence only when said compute-compare-branch sequence would have executed during an iteration of said loop only if a specified condition exists during said iteration.

10. The method of claim 9, wherein the optimizer further comprises a loop unrolling optimizer, further comprising the step of performing loop unrolling optimization on each of said compute-compare-branch sequences which would have executed during each iteration of the loop by the loop unrolling optimizer.

11. A computer-implemented compiler for converting source code into optimized machine code, the compiler having an optimizer comprising:

a delayed condition branch optimizer, including,
  a compute-compare-branch detector configured to generate a first delayed conditional branch output code comprising instructions in delayed conditional branch input code input to said delayed condition branch optimizer when said delayed conditional input code does not contain a loop with a compute-compare-branch sequence,
  and further configured to generate compute-compare-branch code comprising said loop with said compute-compare-branch sequence, said compute-compare-branch sequence having instructions to:

(1) execute a computation to compute the value of a variable;

(2) execute a comparison involving; said variable; and (3) execute conditional instructions if a condition is indicated by said comparison; and a loop restructurer, coupled to said compute-compare-branch detector, configured to replace said compute-compare-branch sequence of said loop in said compute-compare-branch code with a compare-compute-branch sequence, and generating a second delayed condition branch output code comprising said compute-compare-branch code having said compare-compute-branch sequence comprising instructions to:

(1) execute said comparison involving a previous value of said variable;

(2) execute said computation to compute a current value of said variable; and (3) execute said conditional instructions if said condition is indicated by said comparison involving said previous value of said variable.

12. The compiler of claim 11, wherein said loop restructurer comprises:

an initial branch precluder configured to insert, for each said compute-compare-branch sequence in said loop, an operation to be executed before said loop to set a temporary variable so that said condition will not be indicated when said comparison involving said temporary variable is executed;

a sequence replacer configured to replace said compute-compare-branch sequence in said compute-compare-branch code generated by said compute-compare-branch detector with instructions to:

(1) execute said comparison involving said temporary variable;

(2) execute said computation to compute said current value of said variable;

(3) execute said conditional instructions if said condition is indicated by said comparison involving said previous value of said variable; and (4) assign the value of said variable to said temporary variable; and a loop terminator configured to generate, for each compute-compare-branch sequence, operations to be executed after said loop to:

(1) execute said comparison involving said temporary variable; and (2) execute said conditional instructions if said condition is indicated by said comparison involving said previous value of said variable.

13. The compiler of claim 11, wherein said delayed conditional branch input code is intermediate code and said delayed conditional branch output code is optimized intermediate code.

14. The compiler of claim 13, further comprising:

a front end, coupled to said optimizer and adapted to receive the source code, configured to convert the source code into said intermediate code; and a machine code generator, coupled to said optimizer, configured to convert said optimized intermediate code into said optimized machine code.

15. The compiler of claim 11, wherein said delayed conditional branch input code is machine code, and said delayed conditional branch output code is said optimized machine code.

16. The compiler of claim 15, further comprising:

a front end, coupled to said optimizer and adapted to receive the source code, configured to convert the source code into said intermediate code; and a machine code generator, coupled to said optimizer, configured to convert said machine code into said optimized machine code.

17. The compiler of claim 11, wherein said compute-compare-branch detector and said loop restructurer operate continuously so that each said compute-compare-branch sequence occurring in a loop in said delayed conditional branch input code is replaced with a compare-compute-branch sequence in said delayed conditional branch output code.

18. The compiler of claim 11, wherein said compute-compare-branch sequence is replaced by said compare-compute-branch sequence only when said compute-compare-branch sequence would have executed during each iteration of said loop.

19. The compiler of claim 11, wherein said compute-compare-branch sequence is replaced by said compare-compute-branch sequence only when said compute-compare-branch sequence would have executed during an iteration of said loop only if a specified condition exists during said iteration.

20. The compiler of claim 19, wherein said optimizer further comprises a loop unroller coupled to said delayed conditional branch optimizer, configured to perform loop unrolling on each of said compute-compare-branch sequences which would have executed during each iteration of the loop.

21. A computer-implemented compiler for converting source code into optimized machine code, comprising:

compute-compare-branch detection means for detecting in delayed conditional branch input code a loop having a compute-compare-branch sequence comprising instructions to:

(1) execute a computation to compute the value of a variable;

(2) execute a comparison involving said variable; and (3) execute conditional instructions if a condition is indicated by said comparison; and loop restructuring means, coupled to said compute-compare-branch detection means, for generating delayed conditional branch output code in which said loop has been restructured by replacing said compute-compare-branch sequence with a compare-compute-branch sequence comprising instructions to:

(1) execute said comparison involving a previous value of said variable;

(2) execute said computation to compute a current value of said variable; and (3) execute said conditional instructions if said condition is indicated by said comparison involving said previous value of said variable.

22. The computer-implemented compiler of claim 21, wherein said loop restructuring means comprises:

initial branch precluding means for generating an operation to be executed before said loop to set a temporary variable so that said condition will not be indicated when said comparison involving said temporary variable is executed;

sequence replacing means for replacing said compute-compare-branch sequence with instructions to:

(1) execute said comparison involving said temporary variable;
(2) execute said computation to compute said current value of said variable;
(3) execute said conditional instructions if said condition is indicated by said comparison involving said previous value of said variable; and
(4) assign the value of said variable to said temporary variable; and loop termination means for generating operations to be executed after said loop to:
(1) execute said comparison involving said temporary variable; and
(2) execute said conditional instructions if said condition is indicated by said comparison involving said previous value of said variable.

23. The computer-implemented compiler of claim 21, wherein said delayed conditional branch input code is intermediate code, and said delayed conditional branch output code is optimized intermediate code.

24. The computer-implemented compiler of claim 23, further comprising:
front end means for convening the source code into said intermediate code; and
back end means, coupled to said front end means, for convening said intermediate code to said optimized machine code, said back end means including,
machine code generating means, coupled to said front end, for converting said optimized intermediate code into said optimized machine code.

25. The computer-implemented compiler of claim 21, wherein said delayed conditional branch input code is machine code, and said delayed conditional branch output code is said optimized machine code.

26. The computer-implemented compiler of claim 25, further comprising:
front end means for converting said source code into said intermediate code; and
back end means, coupled to said front end means, for convening said intermediate code to said optimized machine code, said back end means including,
machine code generating means, coupled to said front end, for converting said optimized intermediate code into said machine code.

27. The computer-implemented compiler of claim 23, wherein said compute-compare-branch detecting means and said loop restructuring means operate continuously so that each said compute-compare-branch sequence occurring in a loop in said delayed conditional branch input code is replaced with a compare-compute-branch sequence in said delayed conditional branch output code.

28. The computer-implemented compiler of claim 21, wherein said compute-compare-branch sequence is replaced by said compare-compute-branch sequence only when said compute-compare-branch sequence would have executed during each iteration of said loop.

29. The computer-implemented compiler of claim 21, wherein said compute-compare-branch sequence is replaced by said compare-compute-branch sequence only when said compute-compare-branch sequence would have executed during an iteration of said loop only if a specified condition exists during said iteration.

30. The computer-implemented compiler of claim 29, further comprising a loop unrolling means for performing loop unrolling optimization on each of said compute-compare-branch sequences which would have executed during each iteration of said loop.

* * * * *